May 12, 1953
O. W. SCHOTZ
2,638,193
TRANSMISSION CONTROL
Filed July 31, 1946
3 Sheets-Sheet 1
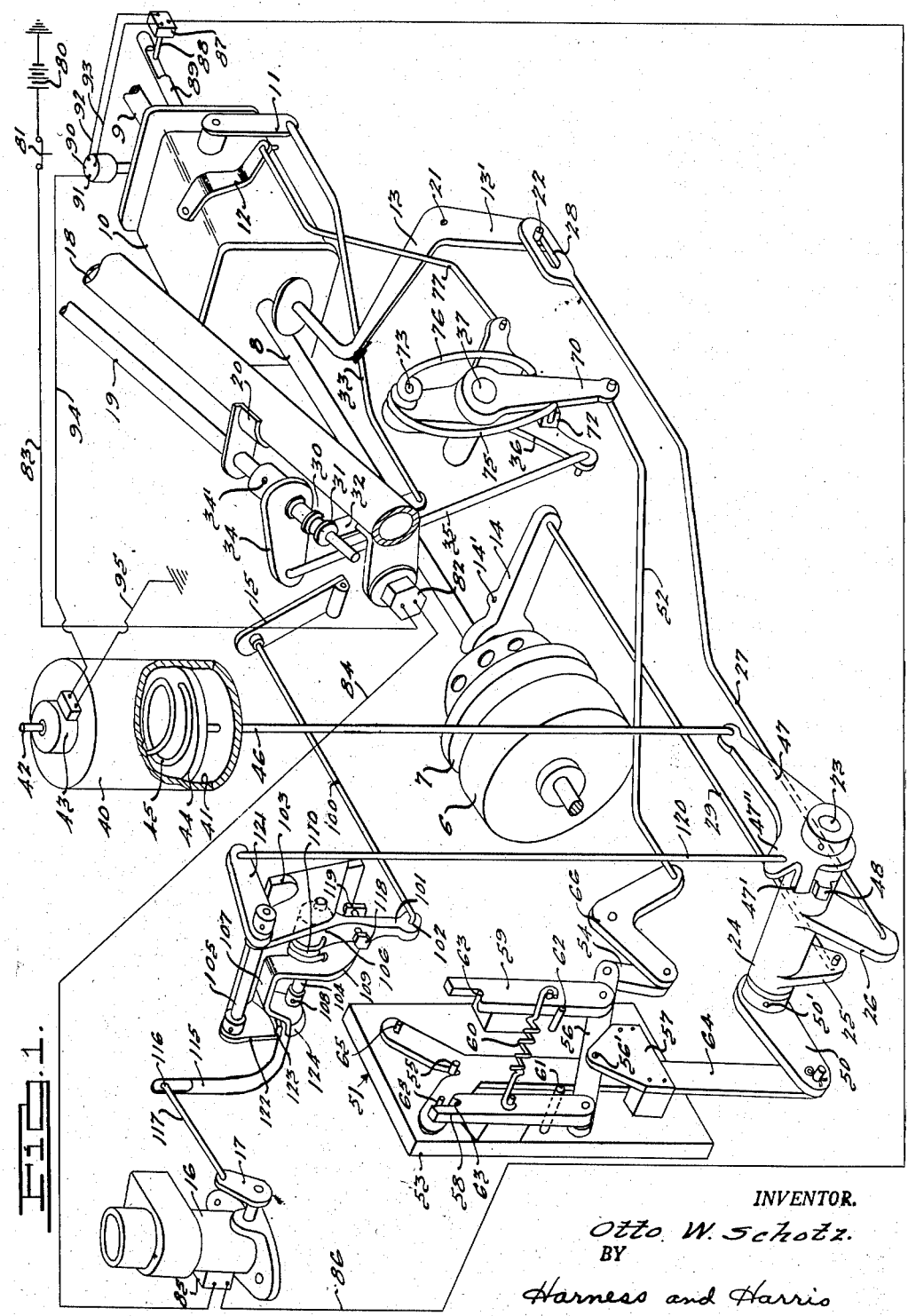
INVENTOR.
Otto. W. Schotz.
BY
Harness and Harris
ATTORNEYS.

May 12, 1953 — O. W. SCHOTZ — 2,638,193
TRANSMISSION CONTROL
Filed July 31, 1946 — 3 Sheets-Sheet 2
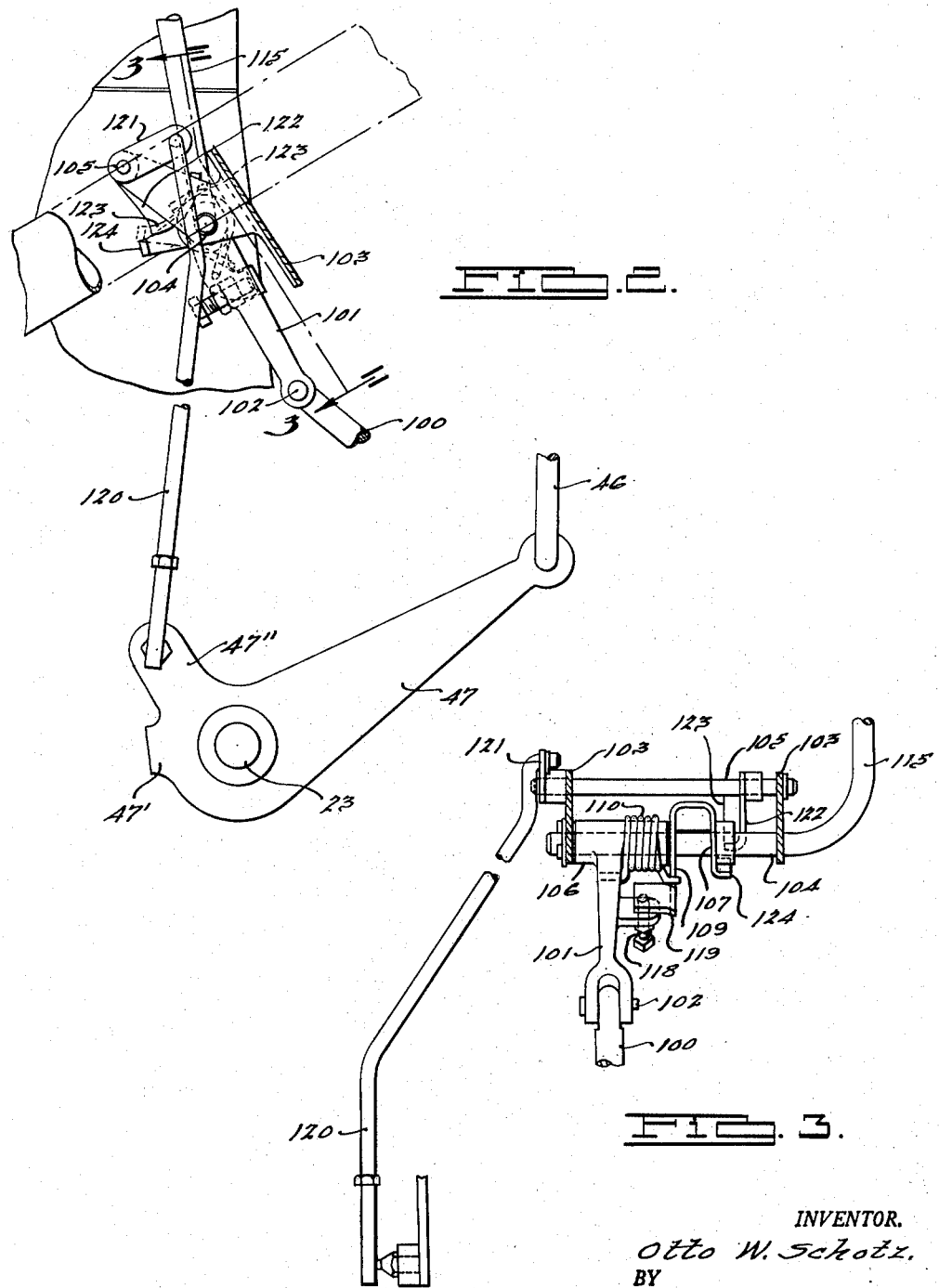
INVENTOR.
Otto W. Schotz,
BY
Harness and Harris
ATTORNEYS.

May 12, 1953 — O. W. SCHOTZ — 2,638,193
TRANSMISSION CONTROL

Filed July 31, 1946 — 3 Sheets-Sheet 3

INVENTOR.
Otto W. Schotz.
BY
Harness and Harris
ATTORNEYS.

Patented May 12, 1953

2,638,193

UNITED STATES PATENT OFFICE 2,638,193

TRANSMISSION CONTROL

Otto W. Schotz, Detroit, Mich., assignor to Chrysler Corporation, Highland Park, Mich., a corporation of Delaware Application July 31, 1946, Serial No. 687,248

8 Claims. (Cl. 192—.073)

This invention relates to automotive vehicle transmission controls and more particularly to a mechanism by which the vehicle driver may initiate a change in transmission speed ratio drive and means to prevent the driver from interrupting the operation of the mechanism before the change is effected.

Apparatuses for automatically changing speed ratio drives in motor vehicle transmissions have been developed. These apparatuses are usually responsive to driver signal as for example by throttle closing within predetermined vehicle speed limits to initiate a cycle including a change in transmission speed ratio drive. These apparatuses require an interval of time for the change in speed ratio drive to occur. Means are provided herein to prevent the driver from interrupting the cycle of this apparatus once he has initiated its action. Such interruption would be very undesirable with an apparatus which is activated by releasing the accelerator pedal at the proper vehicle speed. If the driver steps on the accelerator pedal before the interval of time required for the completion of the change has elapsed no speed ratio drive will be in effect and the engine then will not be operatively connected to the vehicle driving wheels. This is a very undesirable situation which might cause accidents. For example, if in traffic a driver signals for a change in speed ratio drive and then observes an oncoming vehicle which it appears will collide with his vehicle, the natural tendency is for the driver, in panic, to depress the accelerator pedal. If the shift is interrupted as explained above, the vehicle will coast and the engine will race, whereas if a means had been provided to prevent the driver from interrupting the change in speed ratio drive, a driving connection between the engine and vehicle wheels would have been obtained in a relatively short interval of time.

It has been found desirable to incorporate in these apparatuses a means for preventing the driver from interrupting the "cycle" of the apparatus in effecting the change in speed ratio drive. It has also been found to be desirable to provide a positive operating connection between this means and the prime mover of the transmission control mechanism as, for example, the single acting vacuum cylinder and piston used in some apparatuses of the type referred to above.

The transmission control will be described herein in conjunction with a throttle apparatus as a typical application thereof although it is not intended that the invention be limited to the throttle control apparatus described.

In the drawings:

Fig. 1 is a diagrammatic view of a transmission and clutch control apparatus of which my invention forms a component part;

Fig. 2 is a side view of my throttle closing device;

Fig. 3 is an elevated view of my throttle closing device taken on the line 3—3 of Fig. 2;

Figure 4:
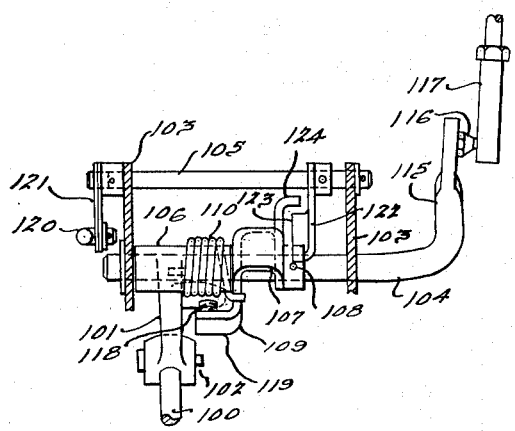
Fig. 4 is a top plan view of my device.

Referring to Fig. 1 the transmission and clutch control apparatus will be described. A transmission housing 10 for a standard transmission having three forward speeds and a reverse speed is illustrated as connecting driving shaft 8 and driven shaft 9. Housing 10 has a selector lever 11 and shift lever 12 pivotally mounted thereon. The fluid coupling 6 and clutch 7 operatively connected to the shaft 8 are shown in conjunction with clutch pedal 13 and clutch throw-out fork 14. Accelerator pedal 15, and carburetor 16 having throttle lever 17 rotatably mounted thereon are also illustrated. The housing 18 for the steering column is shown supporting a manual shift control rod 19 by bracket 20.

Manual means are provided in the apparatus illustrated in Fig. 1 for the operation of the clutch and control of the transmission speed ratio drive. The clutch pedal 13 is rotatably mounted at 21 on a shaft (not shown). An extension 13' of clutch pedal 13 depends below rotatable mounting 21 and has fixed thereto a pin 22. A torque shaft 23 has one end thereof rotatably mounted on the vehicle frame (not shown) and the other end rotatably mounted adjacent the engine block (not shown) in a manner well known in the art. A collar 24 is rotatably mounted on torque shaft 23. A pair of lugs 25 and 26 extending from collar 24 normal to the axis thereof form levers by which rotation of collar 24 on shaft 23 is induced and transmitted to the clutch throw-out fork 14. Lug 26 has pivotally connected thereto a rod 27 which has a slot 28 in its opposite end. Pin 22 of clutch pedal 13 cooperates with slot 28 to form a connection which will cause counterclockwise rotation of collar 24 when clutch pedal 13 is rotated counterclockwise but will permit motion of collar 24 independently of pedal 13, as an incident to automatic control to be described herein. A rod 29 operatively connects lug 25 with the clutch throw-out fork 14. It is, therefore, evident that when the vehicle driver depresses pedal 13 rod 27 is pulled to the right in Fig. 1 thereby rotating collar 24 in a counterclockwise direction and through lug 25 and rod 29 the clutch throw-out fork 14 is rotated about its conventional pivot 14' to disengage the clutch.

The manual shift control rod 19 is slidably mounted in bracket 20 and adapted for both axial and rotary movement. As is usual in the art the axial movement is adapted to select the conventional transmission shift rail which is to be moved and rotation thereof slides the shift rail in one of two directions (depending upon the direction of rod rotation) to effect the desired transmission speed ratio drive connection. A pair of spaced circumferential collars 30 and 31 located adjacent the base of rod 19 receive therebetween the end of a lever 32 which is rotatably mounted (not shown) adjacent its mid portion to some fixed object such as a portion of the vehicle body structure. A rod 33 connects lever 32 with transmission selector lever 11. Axial movement of rod 19 is transmitted through this linkage to selector lever 11.

An arm 34 is keyed to rod 19, as by a pin 34' and has connected to the outer end thereof a depending rod 35. A bifurcated lever 36 is rotatably mounted on a shaft 37 and one arm thereof is connected to rod 35. A rod 77 connects the other arm thereof to transmission shift lever 12. Rotation of rod 19 through the linkage just described rotates shift lever 12 for manual transmission control.

In Fig. 1 automatic means have been superimposed on the manual controls just described. An air tight housing 40 containing a cylinder 41 has a tubular connection 42 with the engine intake manifold. A solenoid valve 43 is adapted to selectively open and close this connection and vent cylinder 41. A piston 44 is slidably mounted in cylinder 41 and a spring 45 acting on piston 44 and reacting on housing 40 urges piston 44 to one end of cylinder 41. Manifold low pressure or "vacuum" as it is commonly referred to overcomes spring 45 when valve 43 is open. The piston and housing thus constitute a pressure differential operated motor. Piston rod 46 is connected to arm 47 which is keyed to torque shaft 23. An ear 47' on arm 47 is adapted to engage a lug 48 on collar 24. When cylinder 41 is connected with the manifold through valve 43 and tubular passage 42 piston 44 is raised and piston rod 46 rotates arm 47 in a counterclockwise direction. Ear 47' engages lug 48 on collar 24 to rotate the collar and through lug 25 and rod 29 move clutch throwout fork 14 to disengage the clutch. The lost motion connection at slot 28 between rod 27 and clutch pedal 13 prevents the rotation of collar 24 from actuating the clutch pedal 13. When valve 43 closes cylinder 41 to the manifold and vents the cylinder, spring 45 returns the parts described to their original position permitting the clutch to reengage.

The movement of piston 44 also effects a change in transmission speed ratio drive. The apparatus is designed to actuate one shift rail selectively in either of two directions. In the preferred form a standard transmission having a shift rail controlling second speed and direct drive is controlled by movement of piston 44 so that the apparatus herein automatically effects changes of speed ratio drive between a relatively slow drive of the driven wheels and a relatively fast drive. Arm 50 is keyed to shaft 23 by pin 50'. An alternator, generally designated by the numeral 51 has a rod 52 operatively connected thereto. Alternator 51 is adapted to translate counterclockwise rotation of arm 50 to alternate pushing and pulling motion of rod 52. A support plate 53 is secured to a stationary object (not shown). A pin 55 projects from the surface of plate 53. A lever 56 is fulcrumed at 56' to a bracket 57 supported by plate 53. A pair of upwardly extending fingers 58 and 59 are rotatably mounted on lever 56 on opposite sides of the fulcrum 56'. Spring 60 connects fingers 58 and 59 and urges them toward each other. The fingers 58 and 59 have a recessed portion with shoulders 63 adjacent the upper ends thereof. A bifurcated lever 64 is rotatably connected to arm 50 and has a pin 65 mounted on each fork thereof and adapted to engage shoulders 63. Pins 61 and 62 in plate 53 guide the fingers and cooperate with the arcuate paths of the connections of the fingers with lever 56 to direct the shoulder 63 portion of the fingers toward the pin 55 when the finger occupies its highest position in Fig. 1. A link 54 and bellcrank 66 transmit motion of lever 56 to rod 52. In the operation of the alternator with the parts in the positions shown in Fig. 1 downward motion of arm 50 will pull lever 64 downwardly and one pin 65 will push finger 58 downwardly thereby rotating lever 56 in a counterclockwise direction about fulcrum 56' raising link 54, rotating bellcrank 66 and pulling rod 52 to the left. With lever 56 in this position finger 59 has been raised and the portion thereof connected to lever 56 has been swung outwardly on an arc about fulcrum 56' with the spring 60 urging the upper portion thereof to the left as far as pin 62 will permit in Fig. 1. When arm 50 is raised the bifurcated lever 64 is centered by the cam action of pin 55 in the crotch thereof so that on its next downward movement the other pin 65 engages shoulder 63 of finger 59 to reverse the movements described above to thereby push on rod 52. Through this mechanism each successive downward motion of arm 50 reverses the movement of rod 52.

Rod 52 is connected to a device which imparts resiliency to the connection between rod 52 and the transmission control lever so that a solid blow or fast, non-yielding force is not applied through shift control lever 12 to the usual transmission synchronizer. Arm 70 is rotatably mounted on a shaft 37. Rod 52 is connected to arm 70. A pin 73 is provided adjacent one end of the lever 36. The other end of lever 36 is bifurcated. Lever 36 is rotatably mounted on the shaft 37 adjacent the lever crotch. An abutment 72 is provided on lever 36 adjacent its bifurcated end. A spring centered on pin 73 has arms 75 and 76 engaging opposite sides of abutment 72 and engaging opposite sides of arms 70. One leg of the bifurcated end of lever 36 is connected by rod 77 with transmission shift lever 12. The other leg is connected by rod 35 to arm 34 of shift control rod 19. When alternator 51 pulls on rod 52 arm 70 is rotated clockwise compressing spring arm 75 and lifting it away from abutment 72. Spring arm 76 is then no longer in contact with arm 70 and acts against abutment 72 to rotate lever 36 about axis 37 until abutment 72 is aligned with rod 70 and thereby moving rod 77 and lever 12 to the left. A similar but oppositely directed motion is transmitted through the spring delay means when alternator 51 pushes on rod 52.

Means to control the actuation of piston 44 are provided. A grounded source 80 of electric energy is connected through ignition switch 81 to a switch 82 by electrical conductor 83. Switch 82 is adapted to be closed when the rod 19 is placed in a predetermined position by the vehicle driver. This comprises the means by which the driver selects automatic control. It is desirable to provide a clutching means which will operatively disconnect the shift control rod 19 from the linkage when the driver selects automatic drive. This is desirable so that the shift control rod will not be moved by the automatic linkage movements. This does not form a part of the invention and has not been illustrated herein. Electrical line 84 connects switch 82 with a switch 85 adapted to be closed when the throttle is substantially closed. Line 86 connects switch 85 with a two-way shift rail switch 87 having a finger 88 thereon adapted to be engaged by abutments on an extension 89 of the transmission second and high speed shift rail. A first circuit in switch 87 is disconnected and a second circuit is connected when the shift rail has completed its shift. This switch movement alternates with each transmission speed ratio change on the second and high speed shift rail. A vehicle speed responsive governor 90 has one outlet terminal 91 and two inlet terminals 92 and 93 and is adapted to connect the outlet terminal with one inlet terminal below a predetermined speed and with the other inlet terminal above the predetermined speed. Each inlet terminal is connected to one of the circuits referred to for switch 87. Line 94 connects governor terminal 91 with solenoid valve 43 in manifold line 42. Line 95 grounds the circuit. Valve 43 is adapted to connect cylinder 41 with the manifold line 42 when energized and to close line 42 and vent cylinder 41 to atmosphere when not energized.

In the operation of the apparatus when the driver closes the throttle lever 17 above a predetermined vehicle speed, valve 43 is energized to admit vacuum to cylinder 41. Piston 44 is raised and clutch 7 disengaged through the linkage 46, 47, 47', 48, 24, 25, 29, and 14. This motion of the piston also causes a delayed movement of transmission shift lever 12 through arm 47, shaft 23, alternator 51, rod 52, arm 70, lever 36, and rod 77. The change in speed ratio drive caused by moving shift lever 12 moves the shift rail extension 89 breaking the circuit at switch 87 thereby deenergizing solenoid valve 43 and permitting spring 45 to move piston 44 to the lower end of the cylinder and permitting the clutch to reengage. The switch 87 is now connected with its other circuit preparatory to a repetition of the process when the driver closes throttle lever 17 below a predetermined governor speed. A transmission downshift is then effected in a manner similar to that described above.

In order that the driver cannot open switch 85 before the shift has been completed I have incorporated my novel device in the system. A preferred form is illustrated in Figs. 2, 3, and 4. The linkage connecting throttle lever 17 with accelerator pedal 15 includes my device. Rod 100 which is fixed to accelerator pedal 15 and movable therewith is pivotally connected to arm 101 of my device at 102. A bracket 103 supports my device and has a pair of spaced parallel shafts 104 and 105 rotatably mounted therein. A collar 106 is rotatably mounted on shaft 104 and has arm 101 depending therefrom. Collar 106 and arm 101 form the driving element of my device. The driven element 107 is keyed to shaft 104 as by pin 108. Element 107 has a depending arm 109. A coil spring 110 surrounds collar 106 and has one leg thereof operatively connected to arm 101 and the other leg thereof operatively connected to arm 109. It will, therefore, be evident that under normal operation when pedal 15 is depressed rod 100 moves arm 101 which with collar 106 rotates about shaft 104 and through spring 110 arm 109 of element 107 is rotated thereby rotating element 107 and shaft 104. Shaft 104 has an upwardly extending crank element 115 thereon which has connected thereto at 116 a forwardly extending rod 117 which is connected to throttle lever 17. Thus rotation of shaft 104 induces rotation of the throttle lever 17. Cooperating ear 119 and screw 118 of arms 109 and 101 limit relative motion in one direction.

Means have been provided to interrupt this action when the piston 44 moves. Ear 47'' of arm 47 has connected thereto a rod 120. The shaft 105 previously referred to has a crank 121 keyed thereto. Rod 120 is operatively connected to crank 121. Arm 122 keyed to shaft 105 has a cam surface 123 thereon. Element 107 has projecting rearwardly therefrom an arm 124. In operation, when the driver releases the accelerator pedal and the mechanism described opens valve 43 to connect cylinder 41 with the manifold and move piston 44 the movement of element 107 in response to movement of accelerator pedal 15 is blocked by cam surface 123 of arm 122. When piston 44 begins to move upwardly in Fig. 1 rod 46 rotates arm 47 and ear 47'' thereby pulling down on rod 120 and rotating shaft 105 in a clockwise direction in Fig. 2. Arm 122 and surface 123 move into a position which blocks arm 124. Rotation of rod 104 is then impossible and depression of accelerator pedal 15 will only "wind up" spring 110. When the mechanism described closes and vents valve 43 and spring 45 returns piston 44 to its original position arm 122 is lifted upwardly in Fig. 2 thereby releasing element 107 and permitting rotation thereof through spring 110.

Figure 5:
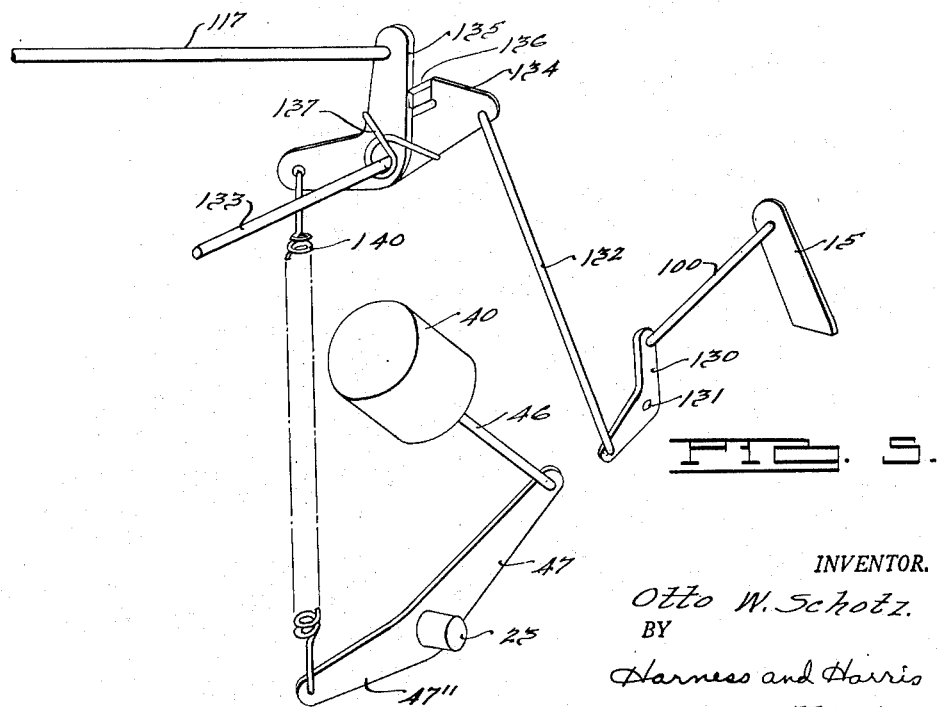
Fig. 5 is a diagrammatic view of a modified form of my device.

A modified form of the device is illustrated in Fig. 5. In this form the accelerator pedal 15 is connected to rod 100 which is operatively connected to one leg of a bellcrank 130 rotatably mounted at 131. The other leg of the bellcrank has rod 132 connected thereto. A shaft 133 has rotatably mounted thereon the element 134 and bellcrank 135. Element 134 has an ear 136 adapted to limit relative motion of bellcrank 135 in one direction. Rod 132 is operatively connected to element 134. The upper leg of bellcrank 135 has throttle control rod 117 fastened thereto. A spring 137 has one end thereof engaging the lower surface of element 134 and the other end thereof engaging an opposite surface on bellcrank 135. Thus, in normal operation depression of accelerator pedal retracts rod 117 through the cooperation of rod 100 and bellcrank 130 which pulls down on rod 132 to rotate element 134 in a clockwise direction and through spring 137 to rotate bellcrank 135 in a clockwise direction. Superimposed upon this mechanism is a spring 140 which is stronger than spring 137. Spring 140 has one end thereof connected to ear 47'' and the other end thereof connected to the second leg of bellcrank 135 and is normally not in tension. However, when piston 44 in cylinder 40 travels upward as explained herein it rotates arm 47 in a counterclockwise direction and pulls spring 140. As explained above, spring 140 is stronger than spring 137 and therefore bellcrank 135 is rotated counterclockwise to its extreme position corresponding to a substantially closed throttle condition. Throttle control rod 117 is extended to the left with this motion to effect a substantial closing of the throttle. Movement of the accelerator pedal under these conditions is ineffectual. When piston 44 in cylinder 40 returns to its initial position in the lower portion of cylinder 40 the tension of spring 140 is relaxed and the throttle control rod may be operated by motion of the accelerator pedal transmitted through the spring 137.

Features of novelty disclosed but not claimed herein are more particularly described and claimed in the copending applications, Serial Number 661,298 filed by Carl A. Neracher et al.; 687,247, 698,451 and 755,661 filed by Otto W. Schotz and 755,612, filed by Maurice C. Robinson.

I claim:

1. In a motor vehicle having an internal combustion engine, a transmission having a plurality of speed ratio drives, a clutch, a pressure differential operated motor and means operably connecting said motor with said transmission and said clutch and adapted to disengage said clutch, change the speed ratio drive in said transmission and re-engage said clutch as an incident to actuation of said motor, said engine having a throttle and a throttle control comprising a throttle control lever, accelerator pedal linkage, an operative connection between said linkage and said lever adapted to transmit motion of said linkage to said lever, said connection comprising a spring controlled lost motion connection adapted to transmit motion through said spring only when the force required to move said lever does not exceed a predetermined amount, and means to increase the resistance of said lever to motion, said last mentioned means being operatively connected to said piston motor so that actuation of said motor as an incident to change in transmission speed ratio drive operatively disconnects said accelerator pedal linkage from said throttle lever while said change in speed ratio drive is being effected.

2. In a motor vehicle having a transmission with a plurality of speed ratio drives, a pressure differential operated motor having an operative connection with said transmission and adapted to change said speed ratio drive when actuated, said vehicle having an internal combustion engine provided with a throttle, means operably connecting said motor with said throttle and adapted to induce actuation of said motor in response to closing of said throttle, a rotatable shaft operatively connected to said throttle and adapted to open and close said throttle when rotated, a first member keyed to said shaft, a second member rotatably mounted on said shaft, manual means to rotate said second member, a spring operatively connecting said members, said first member having a first laterally extending projection thereon, a second rotatable shaft, a second means to rotate said second shaft when a change in transmission speed ratio drive is being effected by actuation of said motor, said second shaft having a laterally extending projection thereon adapted to engage and block said first laterally extending projection when said second shaft is rotated so that rotation of said first member by said second member is prevented and whereby a change in transmission speed ratio drive being effected by said motor cannot be interrupted by manipulation of said manual means.

3. In a motor vehicle having a clutch and transmission and an engine provided with a throttle adapted to be actuated by an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and clutch and adapted to disengage said clutch, change the transmission speed ratio drive and re-engage said clutch as an incident to actuation of said motor, a first movable element operatively connected to said accelerator pedal, a second movable element operatively connected to said throttle, resilient means to transmit motion from said first element to said second element whereby said accelerator pedal controls motion of said throttle, means to restrict movement of said second element, said means being operatively connected to said motor whereby actuation of said motor causes said last mentioned means to restrict movement of said second element and motion of said accelerator pedal is not transmitted to said second element by said resilient means so that driver manipulation of the accelerator pedal cannot interfere with a previously initiated motor actuation.

4. In a motor vehicle having a clutch and transmission and an engine provided with a throttle controlled by an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and said clutch and adapted to disengage said clutch, change the transmission speed ratio drive and re-engage said clutch as an incident to actuation of said motor, a first movable element operatively connected to said accelerator pedal, a second movable element operatively connected to said throttle, resilient means to transmit motion from said first element to said second element whereby said accelerator pedal controls motion of said throttle, means to restrict movement of said second element in the direction tending to open said throttle, said last mentioned means being operatively connected to said motor whereby actuation of said motor causes said last mentioned means to restrict movement of said second element so that motion of said accelerator pedal in the direction of an increased engine speed position is not transmitted to said second element by said resilient means and motor actuation which is initiated by release of said accelerator pedal cannot be interrupted by later manipulation of said pedal until said transmission speed ratio drive is changed and said clutch re-engaged.

5. In a motor vehicle having a clutch and transmission and an engine provided with a throttle and an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and said clutch and adapted to disengage said clutch, change the transmission speed ratio drive and re-engage said clutch as an incident to actuation of said motor, means to prevent manipulation of said accelerator pedal from interfering with a previously initiated motor actuation, said last mentioned means comprising a rotatable shaft, linkage connecting said shaft with said throttle whereby rotation of said shaft opens and closes said throttle, an arm keyed to said shaft, a collar rotatably mounted on said shaft, linkage connecting said collar with said accelerator pedal adapted to rotate said collar when said accelerator pedal is moved, a spring connecting said collar and said arm so that rotation of said collar rotates said arm and shaft, a second rotatable shaft, linkage connecting said second shaft with said motor and adapted to rotate said second shaft in response to actuation of said motor, an arm keyed to said second shaft and adapted to block motion of said first arm when said second shaft is rotated whereby said spring is unable to transmit motion to said first arm to open said throttle.

6. In a motor vehicle having a clutch and transmission and an engine provided with a throttle, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and clutch and adapted to disengage said clutch, change the transmission speed ratio drive and re-engage said clutch in response to actuation of said motor, and means responsive to actuation of said motor to force said throttle toward its closed position and hold it at this position until said motor actuation is completed whereby the driver cannot interrupt the change in speed ratio drive and clutch re-engagement by throttle manipulation.

7. In a motor vehicle having a clutch and transmission and an engine provided with a throttle and an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and said clutch and adapted to disengage said clutch, change the transmission speed ratio drive and re-engage said clutch in response to actuation of said motor, a first movable element operatively connected to said accelerator pedal, a second movable element operatively connected to said throttle, resilient means to transmit motion from said first element to said second element so that movement of said accelerator pedal induces motion of said throttle, a third means operably connected to said motor and adapted to overcome said resilient means and return said second element and said throttle to substantially closed position whereby the initial closing of said throttle at predetermined vehicle speeds induces actuation of said motor and subsequent manipulation of said accelerator to a position corresponding to an open throttle position is ineffective to interrupt the actuation of said motor.

8. In a motor vehicle having a clutch and transmission and an engine provided with a throttle and an accelerator pedal, a control mechanism for said transmission and clutch comprising a pressure differential operated motor, means providing a fluid flow connection between said motor and a source of vacuum, a valve in said connection operable to selectively connect said motor to said source of vacuum and to atmosphere, solenoid means to control the operation of said valve, an electric circuit including a first switch and a vehicle speed responsive switch and operable to selectively energize and deenergize said solenoid in response to opening and closing of said switches and a mechanical connection between said throttle and said first switch operable to close said first switch in response to substantial closing of said throttle and when said vehicle speed responsive switch is also closed to thereby induce actuation of said motor, means operably connecting said motor with said transmission and clutch and adapted to disengage said clutch, change the transmission speed ratio drive and re-engage said clutch in response to actuation of said motor, a first movable element operatively connected to said accelerator pedal, a second movable element operatively connected to said throttle, resilient means to transmit motion from said first element to said second element, a third means operably connected to said motor and adapted to overcome said resilient means and return said second element and said throttle to substantially closed position, said third means including a relatively strong spring adapted to be loaded by actuation of said motor and to overcome said resilient means and close said throttle.

OTTO W. SCHOTZ.

References Cited in the file of this patent

UNITED STATES PATENTS

| Number | Name | Date |
|---|---|---|
| 905,637 | Beskow | Dec. 1, 1908 |
| 1,137,507 | McKeever | Apr. 27, 1915 |
| 1,911,599 | Bloxsom | May 30, 1933 |
| 2,062,104 | Prince | Nov. 24, 1936 |
| 2,229,055 | Dick | Jan. 21, 1941 |
| 2,296,290 | Mayrath | Sept. 22, 1942 |
| 2,328,921 | Neff | Sept. 7, 1943 |